(12) United States Patent
Chapman (10) Patent No.: US 10,838,120 B2
(45) Date of Patent: Nov. 17, 2020

(54) APPARATUS AND METHOD FOR FORMING A DIFFRACTION GRATING AND PRINTED ARTICLE INCLUDING A DIFFRACTION GRATING

(71) Applicant: Xerox Corporation, Norwalk, CT (US)

(72) Inventor: Edward N. Chapman, Rochester, NY (US)

(73) Assignee: XEROX CORPORATION, Norwalk, CT (US)

(*) Notice: Subject to any disclaimer, the term of this patent is extended or adjusted under 35 U.S.C. 154(b) by 169 days.

(21) Appl. No.: 16/129,104

(22) Filed: Sep. 12, 2018

(65) Prior Publication Data

US 2020/0081167 A1 Mar. 12, 2020

(51) Int. Cl.
| G02B 5/18 | (2006.01) |
| G03G 15/00 | (2006.01) |
| B42D 25/328 | (2014.01) |
| B41M 3/14 | (2006.01) |

(52) U.S. Cl.
CPC ......... *G02B 5/1847* (2013.01); *G02B 5/1861* (2013.01); *G02B 5/1866* (2013.01); *B41M 3/14* (2013.01); *B42D 25/328* (2014.10); *G02B 2005/1804* (2013.01); *G03G 15/6588* (2013.01)

(58) Field of Classification Search
CPC .. G02B 5/1847; G02B 5/1861; G02B 5/1866; G02B 5/18; G02B 5/1819; G02B 2005/1804; B42D 25/328; B41M 3/14; G03G 15/6588; G03G 2215/00869; G03G 2215/00789; G03G 2215/0059; G03G 2215/00578; G03G 2215/00493; G03G 2215/00417

USPC ......................................................... 359/576

See application file for complete search history.

(56) References Cited

U.S. PATENT DOCUMENTS

| 4,648,709 | A | * | 3/1987 | Bushaw | .................. G03G 15/50 355/64 |
| 5,327,201 | A | * | 7/1994 | Coleman | .................. G03G 8/00 156/277 |
| 2017/0336716 | A1 | | 11/2017 | Flagello et al. | |
| 2018/0134062 | A1 | * | 5/2018 | Hansen | ................. B42D 25/364 |
| 2019/0275824 | A1 | * | 9/2019 | Lister | .................... B42D 25/425 |

OTHER PUBLICATIONS

Thorlabs, Diffraction Gratings Tutorial, pp. 1-2 (2018), downloaded from https://www.thorlabs.com on Aug. 17, 2018.

* cited by examiner

*Primary Examiner* — Kristina M Deherrera
(74) *Attorney, Agent, or Firm* — Fay Sharpe LLP (57) ABSTRACT

A method of forming an article including a diffraction grating includes forming a periodic structure by printing lines on a first side of transparent substrate with a toner. The lines have a frequency and a spacing which causes incident light to be diffracted into a plurality of beams travelling in different directions. The method can be used for forming reflective or transmissive diffraction gratings using xerographic printing techniques.

14 Claims, 10 Drawing Sheets

APPARATUS AND METHOD FOR FORMING A DIFFRACTION GRATING AND PRINTED ARTICLE INCLUDING A DIFFRACTION GRATING

BACKGROUND

Aspects of the exemplary embodiment relate to diffraction gratings and find particular application in connection with an apparatus and method for forming a diffraction grating using xerographic printing.

Diffraction gratings are used to diffract light or other incident radiation into several beams and find application in monochromators and spectrometers. Diffraction gratings have a periodic structure, typically formed by parallel ridges or rulings, and can be transmissive or reflective. The directions of the beams depend on the spacing of the grating and the wavelength of the light. See, for example, E. Popov, "Introduction to Diffraction Gratings: Summary of Applications," in "Gratings: Theory and Numerical Applications," E. Popov, Editor (2012), http://www.fresnel.fr/files/gratings/Chapter1.pdf.

Conventionally, diffraction gratings are often formed on sheets of glass and thus are fairly brittle and costly to produce. It would be desirable to have a transmissive or reflective diffraction grating which is easily produced and is flexible. Such a diffraction grating, in additional to conventional uses, could be incorporated into a book or a document.

INCORPORATION BY REFERENCE

The following references, the disclosures of which are incorporated herein by reference in their entireties, are mentioned:

U.S. Pub. No. 20170336716, published Nov. 23, 2017, entitled EUV LITHOGRAPHY SYSTEM FOR DENSE LINE PATTERNING, by Flagello, et al., describes an extreme ultra-violet (EUV) lithography ruling engine configured to print one-dimensional lines on a target workpiece. The device includes a source of EUV radiation, a pattern-source defining a 1D pattern, an illumination unit to irradiate the pattern-source, and projection optics which optically image, with a reduction factor N>1, the 1D pattern on an image surface that is optically-conjugate to the 1D pattern.

U.S. Pub. No. 20180134062, published May 17, 2018, entitled METHOD FOR PRODUCING A DOCUMENT AND A DOCUMENT, by Hansen, et al., describes a method for producing a security document. A security feature of the document includes a diffraction relief structure which is molded into the surface of a varnish layer. The diffraction relief structure is formed by regular gratings in which the spacing of the individual structural elements with respect to each other is smaller than a wavelength A in the visible light range.

BRIEF DESCRIPTION

In accordance with one aspect of the exemplary embodiment, a method of forming an article including a diffraction grating includes forming a periodic structure by printing lines on a first side of transparent substrate with a toner, the lines having a frequency and a spacing which causes incident light to be diffracted into a plurality of beams travelling in different directions.

In accordance with another aspect of the exemplary embodiment, a method of forming an article includes providing a sheet of glossy paper or card, printing lines on a transparent substrate with a xerographic printer, forming a stack comprising the sheet of glossy paper or card, the printed transparent substrate, and at least one transparent layer, and joining the sheet of glossy paper or card, the printed transparent substrate and the at least one transparent layer to form the article.

In accordance with another aspect of the exemplary embodiment, a printing apparatus for forming an article comprising a diffraction grating includes memory which stores a vector pattern cell and instructions for combining multiple instances of the vector pattern cell to form an array of parallel lines, a source of a transparent substrate, a xerographic marking engine which prints the array of parallel lines onto the transparent substrate to form a diffraction grating, and an assembly component which assembles a stack comprising a sheet of glossy paper or card, the printed transparent substrate, and at least one transparent layer and optionally joins the stack together, to form the article.

DETAILED DESCRIPTION

Aspects of the exemplary embodiment relate to an article including a diffraction grating which is generated using a vector pattern cell of parallel lines and to an apparatus and method for forming the article.

The system and method enable a low-cost 3D diffraction grating to be printed on a 2D printer using standard medias and toners.

The method includes forming a periodic structure by printing lines on a transparent substrate with a toner. The lines have a frequency/pitch and a spacing which causes incident visible light to be diffracted into a plurality of (generally several) beams travelling in different directions.

Figure 1:
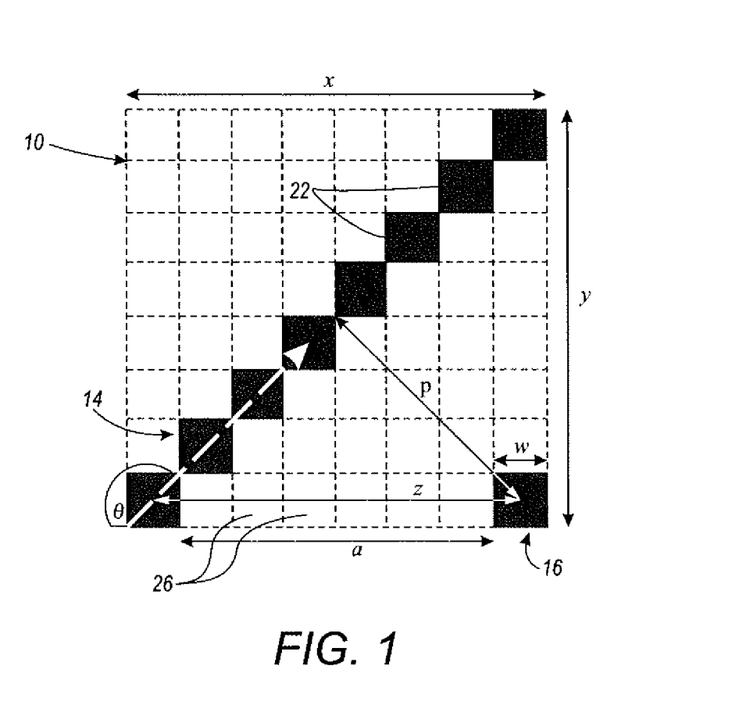
FIG. 1 illustrates a vector pattern cell in accordance with one aspect of the exemplary embodiment.
Figure 2:
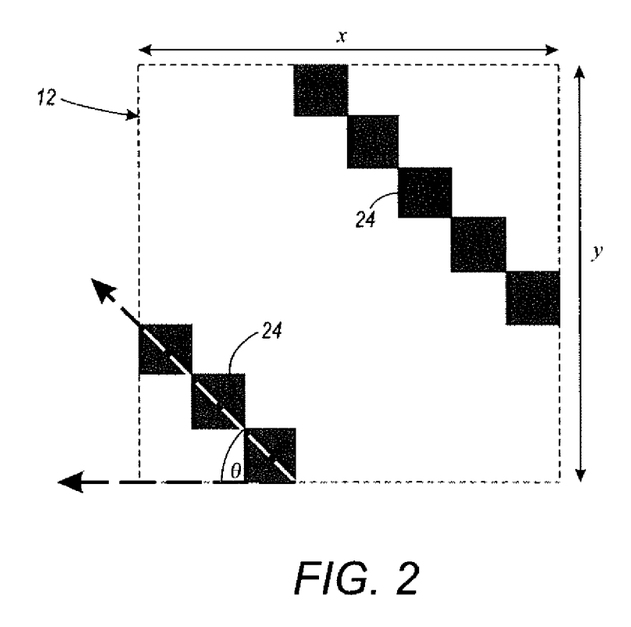
FIG. 2 illustrates a vector pattern cell in accordance with another aspect of the exemplary embodiment.
Figure 3:
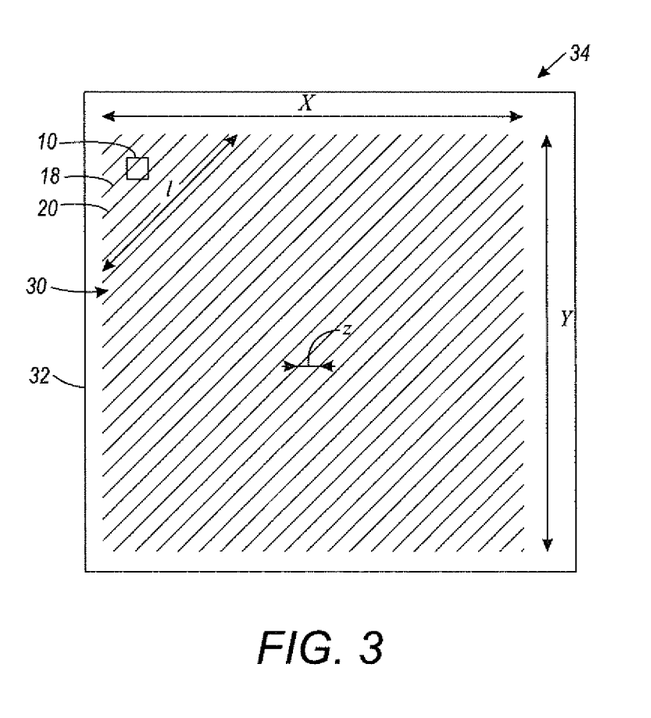
FIG. 3 illustrates an article including a diffraction grating composed of vector pattern cells according to FIG. 1.

FIGS. 1 and 2 illustrate example vector pattern cells 10, 12, having horizontal and vertical dimensions (x, y). Dimensions x and y may be, for example, from 5 to 20 pixels. In one embodiment, x=y. For example, a vector pattern cell 10, 12 includes parts 14, 16 of two (or more) parallel lines 18, 20 (FIG. 3), which are spaced at an interval z in the x and/or y direction(s). The shortest distance (pitch) between midpoints of two adjacent parallel lines is denoted p $$\left(p = \sqrt{2 \times \left(\frac{1}{2}z\right)^2}\right.$$

in the illustrated embodiment). Each line 18, 20 is constructed from a contiguous sequence of "on" pixels 22, 24, etc. Each line 18, 20 can have a width w of as little as one pixel (in the x and/or y direction) although wider lines are contemplated. A pixel represents the smallest dot which can be printed. Pixels are represented by square blocks in FIGS. 1 and 2, although it is to be appreciated that they may have other shapes when rendered by printing. An "on" pixel (shown in black) is one which is intended to be rendered with a marking material, such as dry toner particles. On a given vector pattern cell 10, 12, each line 18, 20 is equally angled at angle θ to the horizontal, such as at 45° to the horizontal. The spacing a between adjacent lines in the x and/or y direction can be as little as 1 pixel, although larger spacings are contemplated, such as at least two, or at least three, or at least four "off" pixels 26 between each adjacent pair of on pixels. For example, in FIG. 1, the lines 18, 20 are one pixel wide and spaced by six "off" pixels 26 in the x and y directions (z=7), or put another way, the "on" pixels have a frequency of 1/7 in the x and y directions. The frequency $$P = \frac{1}{p} = \frac{1}{\sqrt{2 \times \left(\frac{7}{2}\right)^2}} \cong 0.20.$$

As will be appreciated, the vector pattern cell 10, 12, of parallel lines 18, 20 can be generated with a specified angle, frequency and width, which is variable. The cell of FIG. 2 yields a diffraction grating with the same frequency and width as FIG. 1, but with a different angle θ.

As illustrated in FIG. 3, a diffraction grating 30 of size X by Y is created by filling an area of size X×Y with multiple instances of the same vector pattern cell 10 or 12 and printing the array of cells on a substrate 32 to form a printed article 34. For example, X is at least 4x or at least 10x, and/or Y is at least 4y or at least 10 y.

In the printed article 34, the lines may have a width W (in the X and/or Y direction) of no more than 0.01 cm or no more than 0.005 cm, for example. A distance Z between lines 18, 20, may be no more than 0.05 cm, or no more than 0.03 cm. A ratio of Z:W (≅z:w) may be at least 3 or at least 4 or at least 5, such as about 7. The width W of the lines depends on the dots per inch (dpi) of the printer. 600 dpi printers can print up to 300 lines per inch (~118 lines per cm) with an interval z of two pixels, or 75 lines per inch (~30 lines per cm) in X and Y directions with an interval z of 7 pixels (frequency P≅42 lines/cm). Printers with a higher dpi capability, e.g., of 1200 dpi, or 9600 dpi can print a correspondingly larger number of lines per inch with a smaller width W at the same ratio of Z:W.

In one embodiment, the frequency P is greater than 30 lines/cm in order to bend the light into different spectra/colors, such as at least 50 lines/cm, or at least 80 lines/cm, or at least 120 lines/cm, or at least 160 lines/cm, such as up to 2000 lines/cm. Put another way, in various embodiments, the pitch p of the lines may be no greater than 0.35 mm, or no greater than 0.3 mm, or no greater than 0.2 mm, or no greater than 0.15 mm, or no greater than 0.10 mm, or no greater than 0.06 mm.

Figure 4:
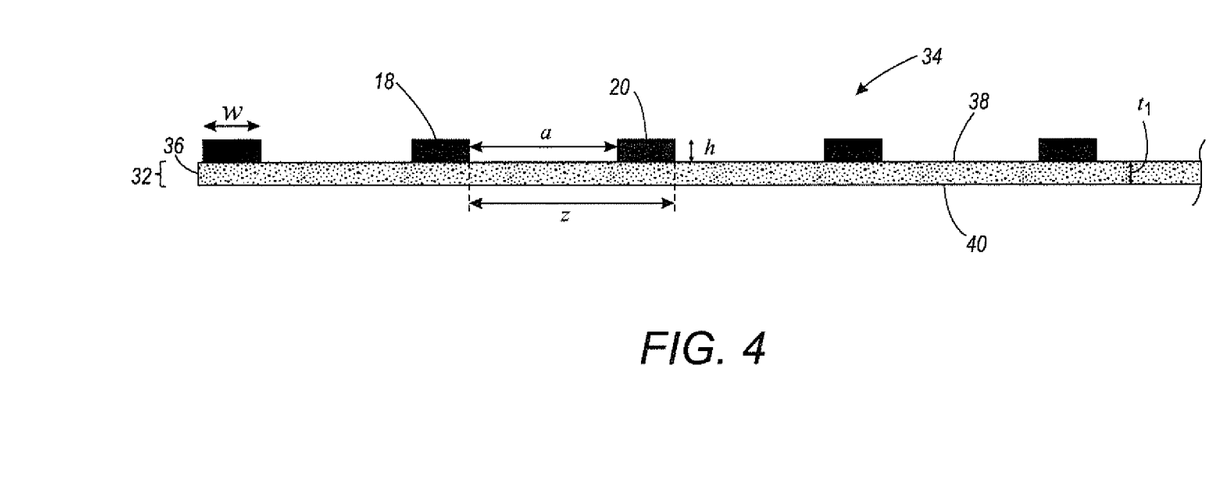
FIG. 4 is a side sectional view of one embodiment of the article of FIG. 3.

In one embodiment, the substrate 32 includes or consists of a single transparent layer 36 (e.g., a sheet or roll) of transparent media, as illustrated in side sectional view in FIG. 4. The lines 18, 20 are printed on an upper (first) surface 38 of the transparent layer 36 with a toner and are in the form of ridges with a height h, a spacing a, and an interval z. An opposite lower (second) surface 40 of the transparent layer 36 defines a lower surface of the printed article 34. As will be appreciated, rather than being rectangles, the ridges defined by the toner lines 18, 20, when viewed under a microscope, appear more like rolling hills than rectangles. This grating 34 passes much of the light and acts as a transmission grating.

The toner (sometimes referred to as dry ink) may be a conventional toner suited to xerographic printing. Suitable toners generally include particles, generally composed of one or more colored pigments embedded inside polymer beads. In one embodiment, the toner is black (K) in color or is a color which generally absorbs incident light. When applied to the sheet 36, the toner particles carry a charge. For example, during printing, a negatively-charged toner is attracted to a positive latent image on a photoreceptor and the toner is then attracted to the transparent layer 36, which also positively charged (or vice versa).

Figure 5:
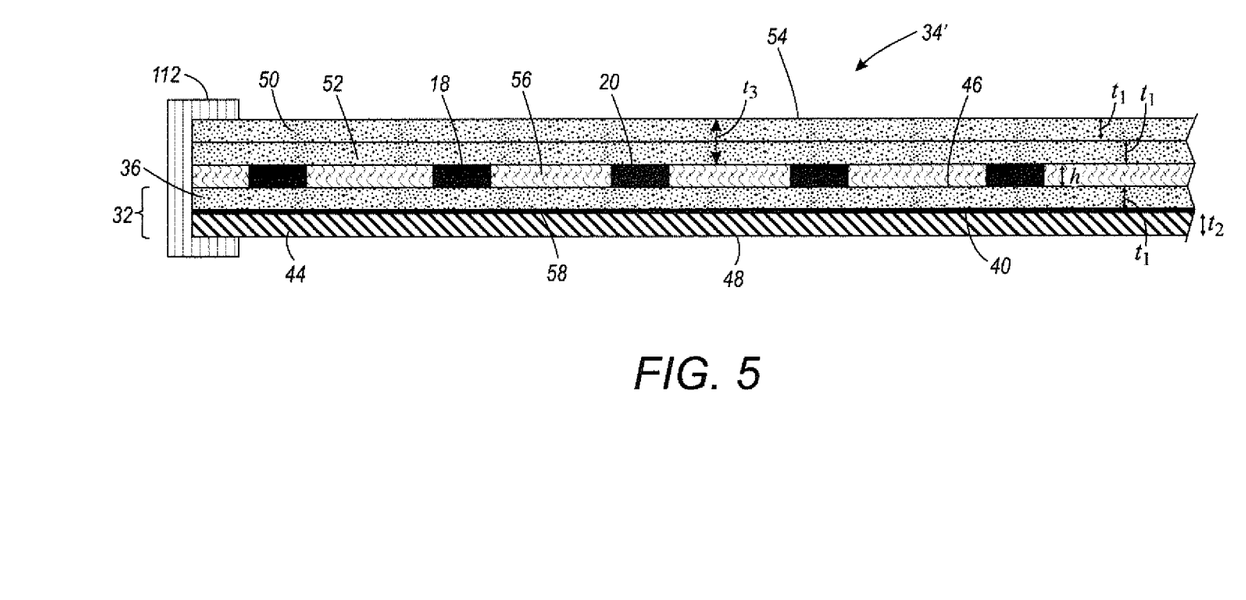
FIG. 5 is a side sectional view of another embodiment of the article of FIG. 3.

In other embodiments, the substrate 32 includes more than one layer, as illustrated in FIG. 5. In the embodiment of FIG. 5, the printed article, denoted 34', includes a multilayer substrate 32, which includes or consists of a lower transparent layer 36, as for FIG. 4, and a light-reflective layer 44, having a first (upper) surface 46 which contacts the lower second surface 40 of the transparent layer 36. The light-reflective layer 44 is thus spaced from the printed lines 18, 20 by the transparent layer 36. An opposite lower (second) surface 48 of the reflective layer 44 defines a lower (second) surface of the printed article 34'. Additionally, the printed article 34' of FIG. 5 (and optionally also FIG. 4) includes at least one upper transparent layer(s) 50, 52. An uppermost one of the upper transparent layers 50 defines an upper surface 54 of the printed article 34'. The layer 52 and/or layer 36 may extend (at least partially) into gaps 56 defined between the printed lines 18, 20 or the gaps 56 may be filled with air or with a separate transparent toner material. While two upper transparent layer(s) 50, 52 are shown, it is to be appreciated that there may be at least three or at least four upper transparent layers, such as up to ten.

In one embodiment, the light-reflective layer 44 is formed of a flexible material, such as a glossy paper or card. The paper or card may be formed from fibers derived primarily from wood, cotton, hemp, or combination thereof. A coating 58 on the paper may be formed from inorganic materials and/or an organic polymer, such as polyethylene. Example inorganic materials include clay (kaolin), chalk (calcium carbonate), bentonite, and talc, and mixtures thereof. The chalk or china clay may be bound to the paper or card with synthetic viscosifiers, such as styrene-butadiene latexes and/or natural organic binders, such as starch. The coating formulation used to form the coating 58 may also contain dispersants, resins, and other additives.

The light-reflective layer 44 has a thickness $t_2$ which may be less than the thickness $t_1$ of the transparent layer 36, depending on the type of glossy paper or card used. $t_2$ may be, for example, at least 0.07 mm and in some cases, up to 0.1 mm, or up to 0.2 mm, or higher in the case of card stock. In some embodiments, the reflective layer 44 may be printed, e.g., using one or more marking materials, such as ink(s) or toner(s).

The reflective layer 44 reflects light in the visible range of the spectrum (about 400 to 700 nm). Reflection can be measured in terms of specular gloss according to TAPPI Test Method T 653 om-07: Specular gloss of paper and paperboard at 20 degrees (70° from the plane of the paper), and may be at least 60, or at least 70.

The printed article 34' of FIG. 5 can serve as a partial mirror.

Figure 6:
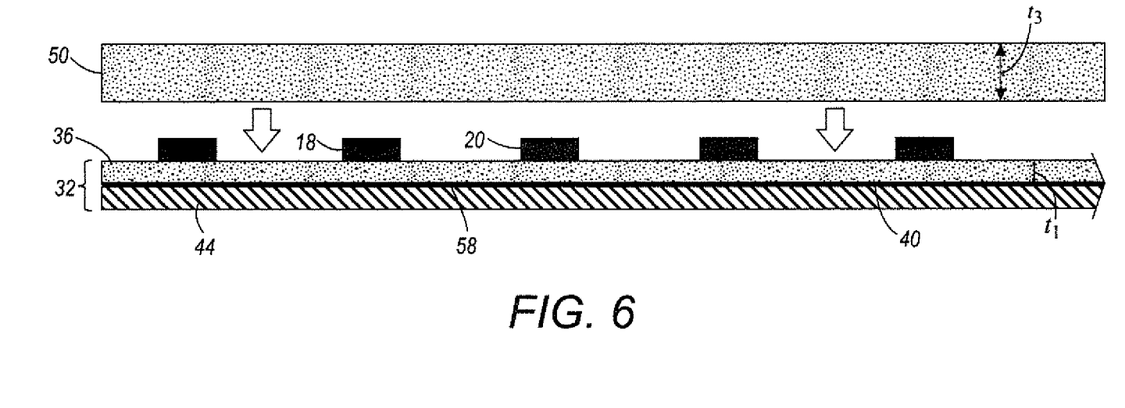
FIG. 6 is a side sectional view of another embodiment of the article of FIG. 3, during assembly.

In another embodiment, the upper transparent layer(s) 50, 52 may be omitted, as illustrated in FIG. 6, and optionally added later.

In the embodiments of FIGS. 4-6, the transparent layer(s) 36, 50, 52 may be transparent sheets that are stacked one on top of the other. The transparent layer(s) 36, 50, 52 transmit light in the visible range of the spectrum, e.g., have a transmission of at least 80% of the visible light which is incident normal (90°) to one surface. As will be appreciated, the layer 36 becomes semi-transparent (i.e., lower transmittance) when printed with the lines 18, 20, etc.

Examples of polymeric materials suitable for use as layers 36, 50, 52 include polyvinyl alcohol (PVOH); polystyrene (PS) and styrene copolymers, such as acrylonitrile-butadiene-styrene (ABS); polyvinylidene fluoride; polyvinyl acetals, such as polyvinyl butyral; unsaturated and saturated polycarbonates; polyvinylpyrrolidone (PVP); polyoxymethylene (also known as acetal, polyacetal, and polyformaldehyde); vinyl imidazole copolymers, such as 1-vinylimidazole; polyamides, such as aliphatic polyamides, polyphthalamides, and aramids; polyethers and polyesters, e.g., polyethylene terephthalate (PET), polybutylene terephthalate, poly(lactic acid) (PLA); cyclic olefin copolymers (COC), such as ethylene-norbornene copolymer; polyaryletherketones, such as polyetheretherketone (PEEK); polyetherimides (PEI) (e.g., ULTEM); polyimides (PI); polyolefins, such as polypropylene (PP) and polyethylene (PE); polyacrylates and methacrylates, such as poly(methyl methacrylate) (PMMA), poly(vinyl chloride) (PVC); polyacrylonitrile (PAN); and copolymers and mixtures thereof. The layers 36, 50, 52 may be formed from the same or different materials.

In one embodiment, the transparent layer(s) 36, 50, 52 may be a standard transparency media, such as polyester (polyethylene terephthalate), cellulose acetate, acrylic, or the like, and may be coated with a thin coating to improve printability.

A suitable thickness of the layers 36, 50, 52 depends, in part, on the type of polymer, which affects the refractive index, strength, and flexibility of the layer. Sheets of polymeric material 36 should be sufficiently flexible yet strong enough to pass through a xerographic printer without breaking or causing jams. Additionally, if upper layers 50, 52 are to pass through the printer, they should also have suitable flexibility and strength properties. The thickness of the layers 36, 50, 52 may be, for example, at least 0.02 mm (20 μm), or at least 0.04 mm and/or up to 1.0 mm, or up to 0.5 mm, or up to 0.3 mm, or up to 0.2 mm, or up to 0.175 mm, or up to 0.15 mm. Where only a single upper layer 50 is used, it may have a thickness of at least 0.1 mm and/or up to 0.5 mm, or greater.

In some embodiments, the layers 36, 50, 52 may all have the same thickness. In some embodiments, the upper layer or layers 50, 52 may have a thickness $t_3$ which is greater than the thickness $t_1$ of the lower layer 36. For example, $t_3$ may be greater than 0.3 mm in some cases, such as at least 0.4 mm or at least 0.5 mm.

In some embodiments, the diffraction grating includes at least 10, or at least 20, or at least 50 lines 18, 20.

Figure 7:
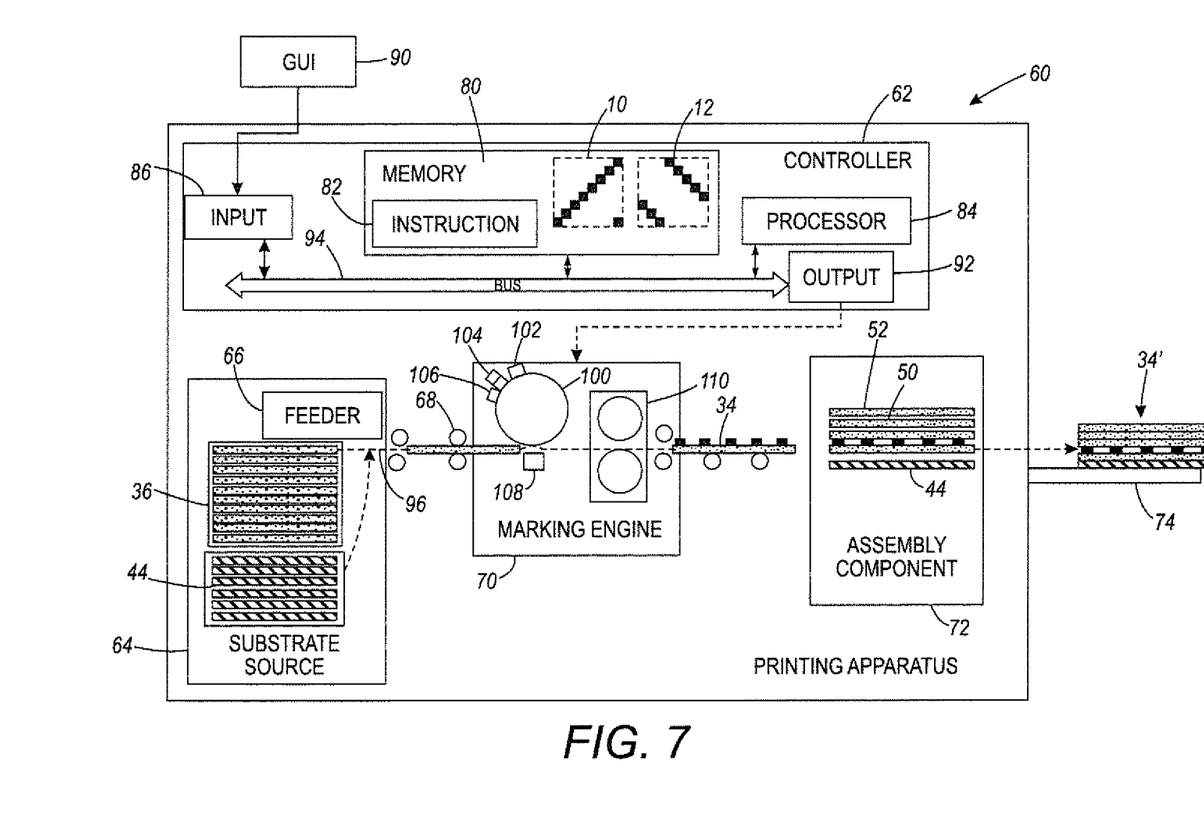
FIG. 7 is a functional block diagram of an apparatus for forming an article comprising a diffraction grating.

FIG. 7 illustrates a printing apparatus 60 for forming the printed article 34, 34' of FIG. 4 or 5. The apparatus includes a controller 62, a substrate source 64, a feeder 66, a transport mechanism 68, a xerographic (electrophotographic) marking engine 70, optionally, an assembly component 72, and an output device 74, such as a tray. The term "printer" or "printing apparatus," as used herein, encompass any apparatus, such as a digital copier, bookmaking machine, facsimile machine, multi-function machine, etc., which performs a print outputting function for any purpose.

The controller 62 includes memory 80, which stores a digital pattern 10 or 12 from which a diffraction grating 30 can be generated by printing multiple instances of the pattern on the substrate layer 36. The memory 80 further includes software instructions 82 for rendering the diffraction grating 30 on the transparent sheet 36. A processor 84, in communication with the memory, executes the instructions. The controller may include an input device 86 for receiving the pattern 10, 12, and/or information for generating the pattern, from a user, e.g., via a graphical user interface (GUI) 90, such as one or more of the width w, interval z and angle θ. The controller includes an output 92 for sending instructions to the marking engine 70 for rendering the diffraction grating 30 on the transparent layer 36. Hardware components 80, 84, 86, 92 of the controller may be communicatively connected by a data/control bus 94. As will be appreciated, the controller, or parts thereof, may be remote from the rest of the printing apparatus 60, e.g., on a remote server connected with the other parts of the printing apparatus.

The memory 80 may represent any type of non-transitory computer readable medium such as random access memory (RAM), read only memory (ROM), magnetic disk or tape, optical disk, flash memory, or holographic memory. In one embodiment, the memory 80 comprises a combination of random access memory and read only memory.

The digital processor device 84 can be variously embodied, such as by a single core processor, a dual core processor (or more generally by a multiple core processor), a digital processor and cooperating math coprocessor, a digital controller, or the like. The digital processor 84, in addition to executing instructions 82 may also control the operation of the printer.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so called "firmware" that is software stored on a ROM or the like. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The substrate source 64 holds a supply of transparent sheets to serve as the lower transparent layer 36 (and optionally also as upper layers 50, 52, etc. and/or reflective layer 44) and may include one or more trays. In some embodiments, a first of the trays holds sheets 36 and a second of the trays holds sheets 44. In another embodiment, one tray holds preassembled substrates 32, each composed of a sheet 44 and a sheet 36 attached thereto.

The feeder 66 supplies the transparent sheets 36 to the transport system 68, which may be composed of rollers, belts, or the like. The transport system 68 conveys the transparent sheets 36 along a print media path 96 to the xerographic marking engine 70, where the diffraction grating 30 is printed on the print media 36 using toner particles to form a semi-transparent diffraction grating layer 34. The exemplary marking engine 70 is a monochrome (single color) marking device, employing a single toner type, such as black toner. However, a color marking engine may alternatively be used. The printed article 34 is conveyed, by the transport mechanism 68, from the marking engine 70 to the assembly component 72 and/or output device 74.

The marking engine 70 includes suitable hardware elements employed in the creation of desired images by electrophotographic processes. The exemplary marking engine includes a charge retentive surface, such as a rotating photoreceptor 100 in the form of a belt or drum. The lines 18, 20, etc., are created on a surface of the photoreceptor. Disposed at various points around the circumference of the photoreceptor 100 are xerographic subsystems which may include a charging station 102, such as a charging corotron, for each of the toner colors to be applied (one in the case of a monochrome printer, four in the case of a CMYK printer), an exposure station 104, which forms a latent image on the photoreceptor (e.g., with a laser or LED light source) corresponding to the lines 18, 20, a developer unit 106, associated with each charging station for developing the latent image formed on the surface of the photoreceptor by applying a toner to obtain a toner image. A transferring unit 108, such as a transfer corotron and/or an intermediate transfer belt, transfers the toner image (diffraction grating) thus formed to the surface of the transparent sheet 36 as it passes by the photoreceptor. Optionally, a fuser 110 fuses the diffraction grating image 30 to the sheet to form the article 34. The fuser generally applies at least one of heat and pressure to the sheet 36 to physically attach the toner to the sheet 36.

The assembly component 72 may be used to form the printed article 34' from the printed article 34 output by the marking engine 70. In one embodiment, the assembly component 72 assembles the layers 44, 34, 50, 52 in sequence and joins them together, e.g., with one or more of heat, an adhesive, binding, clamps, and stapling. The assembled layers only need to be joined around a perimeter, outside the area to be used as the diffraction grating 30. Thus, one or more of the four sides can be stapled, glued, bound into a spine of a book, etc., as illustrated in FIG. 5 at 112. The printed article 34" is output. In other embodiments, the assembly component 72 may be a separate device/omitted.

Figure 8:
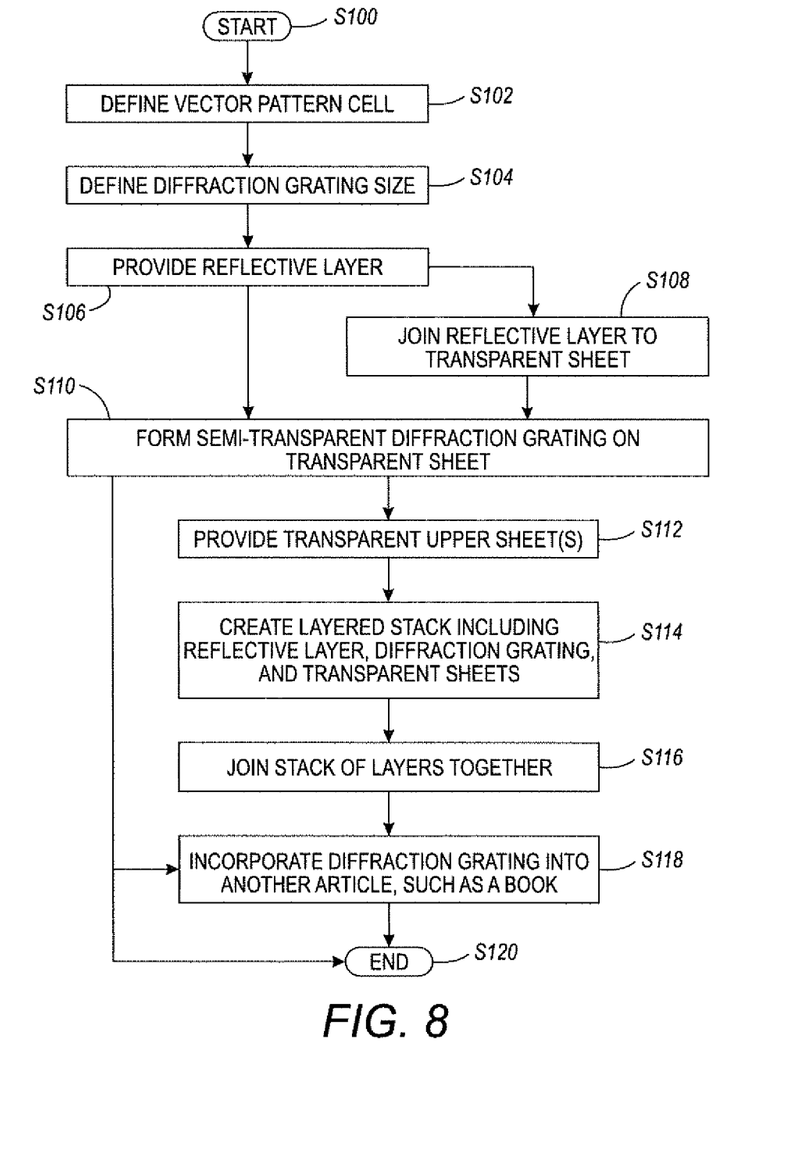
FIG. 8 is a flow chart illustrating a method of forming an article comprising a diffraction grating.

FIG. 8 illustrates a method of printing a diffraction grating in accordance with the exemplary embodiment. The method begins at S100.

At S102, a vector pattern cell 10 or 12 is defined (e.g., as illustrated in FIG. 1 or FIG. 2) that forms continuous parallel lines 18, 20 when multiple instances of the cell are placed next to each other to form an array. This step includes defining a frequency 1/z (or 1/p), angle θ, and width w of the vector. The vector pattern cell 10 or 12 is stored in memory, such as printer memory 80.

At S104, a diffraction grating size is defined (e.g., by a user via the GUI 90), which is used to determine the number of cells 10 to be composed into an array.

In other embodiments, rather than defining a vector pattern cell 10 or 12 and forming an array from multiple instances, a single X×Y array may be defined.

At S106, a reflective layer 44 may be provided, such as a sheet of coated white paper or card, which may be printed with an image. In some embodiments, the reflective layer 44 may be passed through the printing apparatus, e.g., without printing, using feeder 66 and transport mechanism 68. In other embodiments, a stack of reflective layers 44 is provided downstream of the marking engine 70.

In some embodiments, at S108, the reflective layer 44 may be attached to the transparent sheet 36 prior to printing the lines 18, 20, etc.

At S110, a semi-transparent diffraction grating 34 (FIG. 4) is formed by printing lines 18, 20 corresponding to the array 30 of vector pattern cells 10 onto a transparent sheet 36, using the xerographic marking engine 70, to form a pattern of equally-spaced ridges having a length/which is substantially greater than the height h. While this type of printing is often considered 2-dimensional (2D), there is a 3D aspect due to the toner height h.

At S112, one or more transparent sheets for layering over the diffraction grating may be provided. For example, one, two, three, or more fully-transparent sheets 50, 52 may be passed through the printer from the source 64, without printing or with only limited printing in an area outside the region serving as the diffraction grating 30. In other embodiments, a stack of transparent sheets is provided downstream of the marking engine 70.

At S114, a layered stack of medias is created, e.g., by stacking the layers from back to front. The first (optional) layer is the reflective layer 44. The second layer is the semi-transparent diffraction grating layer 34. The third and subsequent layers (optional) are fully-transparent sheets 50, 52, etc.

At S116, the layers 44, 34, 50, 52 in the stack are joined together (FIG. 5), e.g., by binding, stapling, adhesive, and/or heat, or a subset of the layers is assembled, for inclusion of additional layers later.

In one embodiment, first the layers 44, 34 are joined together, as illustrated in FIG. 6, then one or more additional transparent layers 50, 52 is/are joined thereto. In one embodiment, rather than using multiple top layers 50, 52, a single layer 50 may be employed (FIG. 6). In this embodiment, layer 50 has a thickness $t_3$, which is greater than the thickness $t_1$ of layer 36. For example, $t_3 \geq 1.5 \times t_1$, or $t_3 \geq 2 \times t_1$.

The resulting mirror 34' can be used as a standalone mirror or formed into another article. For example, it may be used as a page of a book (S118) This step may be incorporated into step S116.

The method ends at S120.

As will be appreciated, steps S106, S108, S112, S114 and S116 may be omitted to form a transmission grating 34 rather than a reflective grating 34'. The transmission grating 34 may be formed into another article. For example, it may be used as a page of a book (S118).

The method illustrated in FIG. 8 may be implemented, in part, in a computer program product that may be executed by the controller 62. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the controller 62 (for example, an internal hard drive of RAM), or may be separate (for example, an external hard drive operatively connected with the printer), or may be separate and accessed via a digital data network such as a local area network (LAN) or the Internet (for example, as a redundant array of inexpensive or independent disks (RAID) or other network server storage that is indirectly accessed by the controller, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

As will be appreciated, the steps of the method need not all proceed in the order illustrated and fewer, more, or different steps may be performed.

The incident light may be natural or "white" light, having a range of wavelengths in the visible range of the spectrum, or may be monochromatic light. The diffraction grating 34, 34' causes the incident light to be diffracted into several beams travelling in different directions. As is known in the art, diffraction gratings, either transmissive or reflective, can separate different wavelengths of light using a repetitive structure, here a sequence of parallel lines 18, 20, which have a similar height and shape that extends above the layer 36. The structure of the grating affects the amplitude and/or phase of the incident wave, causing interference in the output wave. In the transmissive case, the repetitive structure can be thought of as many tightly spaced, openings, where light can scatter. Solving for the irradiance as a function wavelength and position of the openings, an expression for transmission diffractive gratings when the angle of incidence, relative to normal to the surface, of light on the lower side 40 is $\theta_i$, the spacing is $\alpha$ and the wavelength is $\lambda$ can be defined as in the following simplified grating equation:

$$\alpha[\sin(\theta_m)-\sin(\theta_i)]=m\lambda \qquad (1)$$

where m is the order of principal maxima, such as 0 or 1, and $\theta_m$ is the angle, relative to normal to the upper surface 38, of light exiting the grating. $\theta_i$ and $\theta_m$ are both positive if on the same side of the surface normal, otherwise $\theta_m$ is negative. For a given order m, different wavelengths of light will exit the grating at different angles. For white light sources, this corresponds to a continuous, angle-dependent spectrum.

In the case of a reflective grating, where incident and reflected light are on the same side 38 of the grating, a simplified grating equation can be defined as follows:

$$\alpha[\sin(\theta_m)+\sin(\theta_i)]=m\lambda \qquad (2)$$

where $\theta_i$ is positive and $\theta_m$ is negative if the incident and diffracted light are on opposite sides of the surface normal, otherwise both are positive.

For further details on the theory of diffraction gratings, see, for example Thorlabs Grating Tutorial, available at https://www.thorlabs.com/tutorials.

Figure 9:
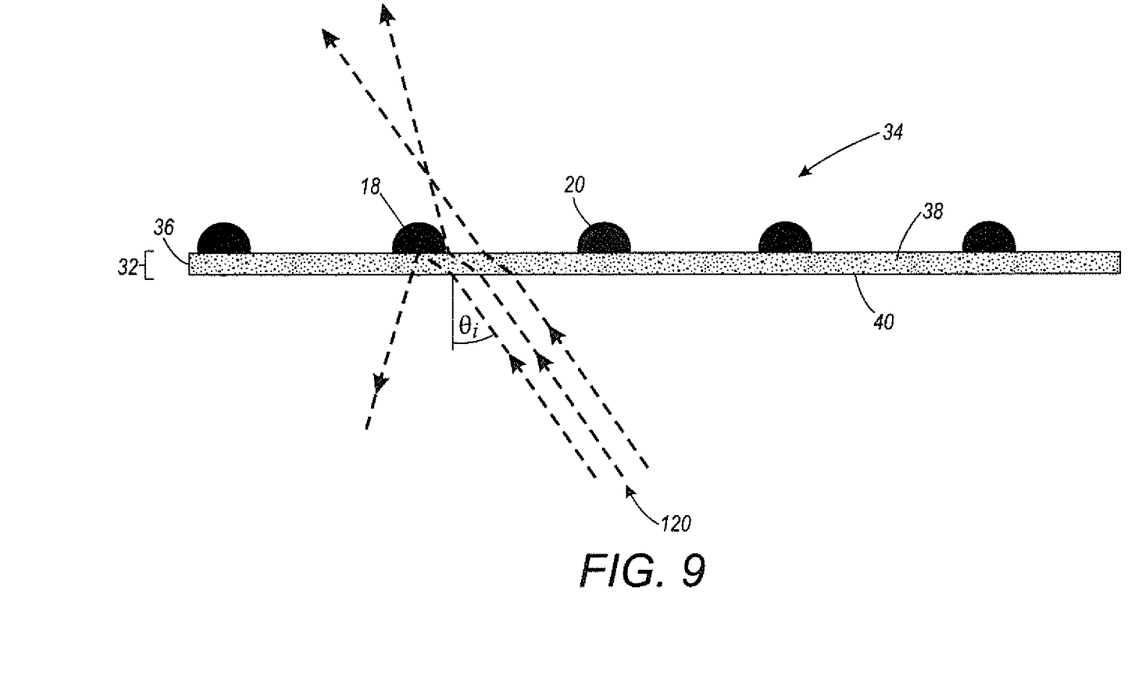
FIG. 9 illustrates light transmission by the article of FIG. 4.

As an example, when illuminated with a beam 120 of light, the transmission grating 34 splits the beam into two (or more) beams with different angles, as illustrated in FIG. 9. Light striking the toner lines 18, 20 tends to be substantially absorbed rather than transmitted or reflected, particularly when the toner is black in color.

Figure 10:
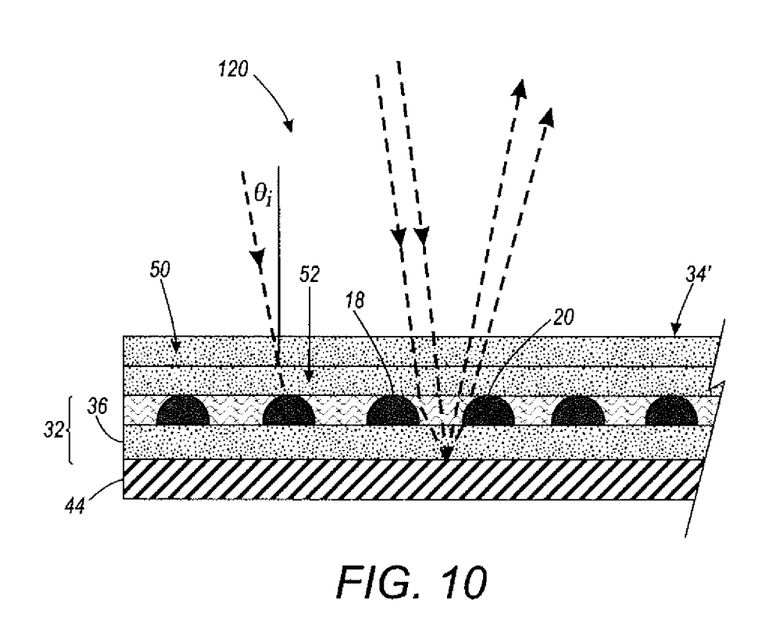
FIG. 10 illustrates light reflection by the article of FIG. 5.

As an example, when illuminated with a beam 120 of light, the reflective grating 34' reflects the beam as two (or more) beams with different angles, as illustrated in FIG. 10.

EXAMPLE

A partial mirror was created by printing a diffraction grating at 75 lines per inch on a transparent plastic transparency material. The transparency material was placed on top of a sheet of glossy paper. Three sheets of the same transparency material were placed on top of the printed diffraction grating and the assembly bound together. The resulting mirror was sufficiently reflective for a user to see features of his face. A higher frequency of lines is expected to produce better results.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of forming an article comprising a diffraction grating comprising:
    passing a sheet of glossy paper or card through a xerographic printer to serve as a reflective layer;
    forming a periodic structure by passing a transparent substrate through the xerographic printer and printing lines on a first side of the transparent substrate with a toner, the lines having a frequency and a spacing which causes incident light to be diffracted into a plurality of beams travelling in different directions;
    passing at least one transparent sheet through the xerographic printer to serve as a transparent layer; and
    forming a stack from the sheet of glossy paper or card, printed transparent substrate, and the at least one transparent sheet, whereby the first side of the printed transparent substrate is covered with the at least one transparent layer; and the sheet of glossy paper or card serves as a reflective layer backing a second side of printed transparent substrate.

2. The method of claim 1, wherein the transparent substrate comprises a flexible polymer sheet.

3. The method of claim 1, wherein the flexible polymer sheet has a thickness of no greater than 0.5 mm.

4. The method of claim 1, wherein the printing comprises xerographic printing.

5. The method of claim 1, wherein the lines have a pitch of no greater than 0.3 mm.

6. The method of claim 1, wherein the lines have a pitch of no greater than 0.2 mm.

7. The method of claim 1, further comprising storing a vector pattern cell in memory, generating an array comprising multiple instances of the vector pattern cell in memory and printing the printing lines in accordance with the array.

8. The method of claim 7, wherein the vector pattern cell includes portions of at least two lines, each portion being one pixel in width and being spaced from the portion of the next line by at least two pixels.

9. The method of claim 1, further comprising joining the printed transparent substrate to the at least one of the reflective layer and the at least one transparent layer.

10. The method of claim 1, wherein the at least one transparent layer comprises a plurality of transparent layers.

11. The method of claim 1, wherein the article is a book which incorporates the stack.

12. The method of claim 1 wherein the diffraction grating is a reflective diffraction grating.

13. An article formed by the method of claim 1.

14. A method of forming an article comprising:
    providing a sheet of glossy paper or card;
    printing lines on a transparent substrate with a xerographic printer, the lines have a similar height and shape that extends above the transparent substrate to provide a diffraction grating;

wherein the sheet of glossy paper or card and transparent substrate are both passed through the xerographic printer;

forming a stack comprising the sheet of glossy paper or card, the printed transparent substrate, and at least one transparent layer, each of the at least one transparent layer comprising a flexible polymer sheet; and joining the sheet of glossy paper or card, the printed transparent substrate and the at least one transparent layer to form the article.

* * * * *